United States Patent [19]

Clements

[11] 4,135,758
[45] Jan. 23, 1979

[54] MOTORCYCLE TOURING FAIRING

[76] Inventor: Vern E. Clements, P.O. Box 608, Caldwell, Id. 83605

[21] Appl. No.: 867,430

[22] Filed: Jan. 6, 1978

[51] Int. Cl.² .............................................. B62J 17/04
[52] U.S. Cl. .................................................... 296/78.1
[58] Field of Search .......................... 290/78.1, 78, 15; 280/289 S

[56] References Cited

U.S. PATENT DOCUMENTS

| | | | |
|---|---|---|---|
| 3,154,342 | 10/1964 | Mueller | 296/78.1 |
| 3,787,088 | 1/1974 | Dreyer, Sr. | 296/78.1 |
| 3,866,971 | 2/1975 | Hugon | 296/78.1 |
| 3,922,031 | 11/1975 | Hugon | 296/78.1 |
| 4,023,853 | 5/1977 | Oguma et al. | 296/78.1 |
| 4,066,291 | 1/1978 | Hickman | 296/78.1 |

Primary Examiner—Robert R. Song
Attorney, Agent, or Firm—James D. Givnan, Jr.

[57] ABSTRACT

A fairing attached to the motorcycle frame and having forwardly inclined supports each secured at their lower ends at multiple points to the frame down-tubes. The fairing and a frontal closure panel define curved openings for the passage of the motorcycle front fork with the openings being of a size and shape to permit full steering movement. The fairing defines an oblong headlight opening permitting a full range of headlight movement. A pliable glare shield on the fairing prevents headlight reflection to the operator's eyes. Detachable storage bags are removably mounted on the interior of the fairing by means of pressure-sensitive closure strips. A windshield on the fairing is secured by a flanged dash member.

6 Claims, 4 Drawing Figures

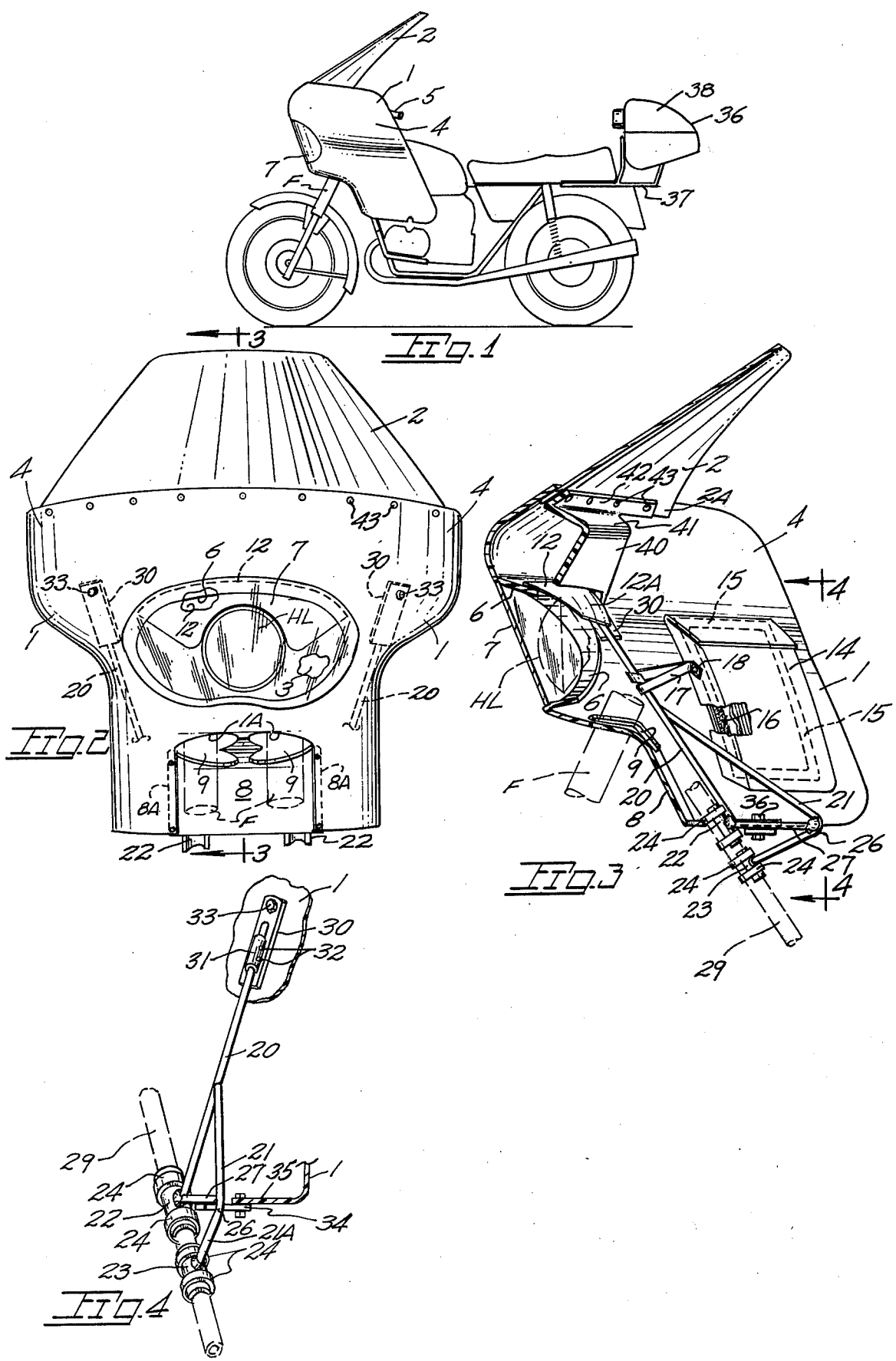

MOTORCYCLE TOURING FAIRING

BACKGROUND OF THE INVENTION

The present invention concerns fairings applied to motorcycles for the purpose of shielding the rider, or riders, from the slipstream and inclement weather. More particularly, the present invention concerns such a fairing mounted in a fixed manner to the motorcycle frame yet permitting turning motion of the motorcycle front fork and its associated components.

Motorcycle fairings have as their primary purpose the shielding of the rider from the slipstream and typically may be mounted to the front fork for arcuate movement therewith or alternatively mounted to motorcycle frame components. Fairings of the former type are necessarily of limited size to prevent interference with steering movement of the front fork. Fairings of the type mounted to the motorcycle frame may provide a larger frontal area for better rider protection but incur the drawback of a complex mounting arrangement to avoid interference with fork movement. A proposed solution is found in U.S. Pat. No. 3,787,088 wherein the fairing is of two-piece design with one of said pieces being movable with the front fork and the headlight mounted thereon. Also movable with the movable fairing piece is a "mud guard" which provides varying degrees of rider protection as it moves in relation to a central opening in the fixed fairing piece.

A problem encountered in those fairings attached to the motorcycle frame is that certain fairings require the removal and re-installation of the motorcycle headlight and/or instrumentation.

SUMMARY OF THE PRESENT INVENTION

The present invention is embodied within a frame-mounted motorcycle touring fairing providing a high degree of slipstream protection to the rider, or riders, attachable to the motorcycle frame without interference with motorcycle components.

The frontal portion of the fairing defines an elongate opening covered by a transparent lens through which a headlight beam may project throughout the range of headlight movement. A pliable glare shield rests on the headlight. Subjacent the above opening are fork openings each of which receives a fork member and is of a size and shape permitting full steering movement of the fork while restricting slipstream passage therethrough. A dash panel attaches to the rearward side of the fairing with a flange thereon additionally serving to provide a sturdy sandwich type mounting for the windshield. Affixed to the interior surfaces of the fairing are detachable storage bags permitting the rider to take with him personal items, tools, etc., when leaving a parked motorcycle. The fairing is securely mounted to the motorcycle frame by mounting brackets incorporating triangulated construction to provide a fairing unaffected by high speed.

An aft mounted fairing is streamlined to provide additional aerodynamic stability in turbulent air and further provides a backrest for a passenger.

The storage bags are held in place preferably by mating fabric strips with a safety strap also being provided which encircles a fairing mounting bracket member.

Important objectives of the present fairing include the provision of a fairing providing a high degree of slipstream and weather protection to the rider or riders; the provision of a fairing readily mountable upon the motorcycle without interference with motorcycle instrumentation or the motorcycle headlight; the provision of a fairing having detachable storage bags held in place by cooperating fabric closure strips; the provision of a fairing having a pliable glare shield partially enclosing the motocycle headlight; the provision of a fairing having a front closure panel with fork openings shaped to permit a full range of fork movement; the provision of a fairing including mounting brackets adapted at their lower ends for secure clamped engagement with the motorcycle down-tubes; the provision of a fairing having mounting brackets each of which is secured at at least two spaced apart points to a down-tube of the motorcycle frame; the provision of a fairing wherein the windshield is secured by a sandwich type securement including a panel disposed on the rearward side of the fairing.

BRIEF DESCRIPTION OF THE DRAWINGS

FIG. 1 is a side elevational view of the present motorcycle fairing on a motorcycle along with a rear mounted fairing constituting a luggage storage compartment;

FIG. 2 is a front elevational view of the front fairing removed from the motorcycle;

FIG. 3 is a vertical sectional view taken along line 3—3 of FIG. 2;

FIG. 4 is an elevational view taken along line 4—4 of FIG. 3 of a fairing support detached from the fairing.

DETAILED DESCRIPTION OF THE PREFERRED EMBODIMENT

With continuing attention to the accompanying drawing, the present fairing is indicated at 1 mounted in detachable engagement with the motorcycle frame.

The fairing includes a windshield 2 inclined rearwardly and of upwardly tapering, streamlined configuration. The fairing 1 is of molded construction preferably of fibre reinforced plastic having an upper widest portion 4 forward of the motorcycle handlebars at 5. Formed within member 1 is an oblong headlight opening 3 defined by a rearwardly extending, continuous flange 6. The juncture of flange 6 with the frontal wall of the fairing is shouldered to receive an inset headlight opening cover 7 of a sturdy, transparant nature and suitably secured by fastening elements.

With reference to FIG. 2, the lower central portion of fairing 1 defines an upwardly extending opening within which is installed a frontal closure panel 8 which partially defines openings 9 through each of which a front fork member F of the motorcycle extends. Said panel is provided with laterally extending lips 8A which fit against the rearward side of fairing 1 and are secured thereto by suitable fasteners. The fork receiving openings 9 are somewhat kidney-shaped to permit arcuate steering fork movement while restricting undesired slipstream passage. An edge 1A of the fairing partially defines fork openings 9.

As best viewed in FIG. 3, a pliable glare shield at 12 is secured along one of its edges to headlight opening flange 6 and has a rearward, depending portion 12A which loosely rests on the top of the motorcycle headlight at HL without restricting the range of headlight travel and thereby provides a glare shield protecting the operator's eyes from any reflection from headlight HL or cover 7. The pliable material may be a heavy duty plastic of an opaque nature.

Indicated at 14 in FIG. 3 is a detachable storage bag for personal items, tools, etc., typical of an unseen companion bag mounted on the opposite, inner side of fairing 1. As shown in dashed lines, storage bag 14 is provided on its unseen side with strips 15 of fabric closure material, such as that manufactured under the registered trademark VELCRO. A cooperating fabric closure member 16 is permanently affixed as by an adhesive to the inner side of fairing 1 corresponding in size and configuration to bag mounted strips 15 to permit bag attachment to the fairing in a secure manner simply by exerting outward pressure on the bag. A safety strap 17 is secured at one of its ends to a forward edge of bag 14 and wrapped about a later described fairing mounting bracket, the strap terminating back at the bag and fastened thereto by suitable means such as a snap 18. A carrying strap on each bag enables convenient carrying when removed from the parked motorcycle.

With particular attention now to FIGS. 3 and 4 wherein I disclose one of two fairing supports comprising fairing mounting means. The non-illustrated support varies from the one shown only in the angular relationship of its components. The supports jointly mount the fairing in place on the motorcycle frame and particularly support the upper portion thereof against slipstream loading. Each support includes a forwardly inclined, primary member 20 and a secondary member 21 each of which terminates downwardly in respecitve securement to semicircular bases at 22 and 23. The bases 22 and 23 have an inside radius corresponding to the outside radius of a motorcycle down-tube 29 comprising part of the motorcycle frame. Circular clamps at 24 extend about each base and an associated down-tube segment to enable secure clamping of each base to the down-tube while permitting convenient bracket removal and subsequent fairing removal from the motorcycle. Clamps 24, for the sake of convenience, may be of the type known as hose clamps. Secondary member 21 of the support is welded at its upper end to, and braces, a medial segment of member 20 and extends rearwardly and downwardly therefrom whereat a bend 26 provides a reversed lower segment 21A to which semicircular base 23 is secured. Extending intermediate bend 26 and semicircular base 22 is an interconnecting brace 27. Accordingly primary member 20 is capable of supporting fairing imparted loads applied to the support upper end by the fairing acting against a support plate 30. With attention to support plate 30, the same is adjustably mounted to primary member 20 of the support to permit both lengthwise and rotational adjustment of the plate relative to the support member axis. A collar 31 affixed to the plate is provided with set screws 32 which engage the support member upper end to lock the plate in place. A fastener assembly at 33 extends through the plate and the fairing.

Each support additionally includes a mounting bracket as at 34 on which rests a fairing bottom flange 35 with a fastener 36 securing the latter to said bracket.

A dash panel 40 provides an inclined dash 41 which may be apertured for the installation of a citizen's band radio or instrumentation beyond that instrumentation originally provided by the motorcycle manufacturer. Alternatively the dash 41 may be formed with a lengthwise extending opening to enable the dash panel to be used for the storage of miscellaneous items. An integral flange 42 extends substantially across the lower edge 2A of the windshield to receive a number of fastener assemblies 43 which extend through said windshield edge and through the upper edge of the fairing. Accordingly the windshield is securely attached to the fairing in a sandwich type mounting which prevents the application of undue forces to the fairing edge. Headlight opening flange 6 provides a bottom closure for dash panel 40.

An aft mounting fairing is indicated at 36 supported by a carrier 37 on the motorcycle frame. The aft fairing constitutes a luggage carrier with a hingedly mounted lid 38. The fairing 36 contributes aerodynamic advantages by reason of reducing turbulence and hence drag while providing a protected storage area for small pieces of luggage.

The present fairing provides a high degree of rider protection and, as aforesaid, may be mounted without disruption of motorcycle accessories or instrumentation. When so mounted, the motorcycle components operate in their original, unhindered manner. With but slight modification the present fairing may be readily adapted to several makes and models of motorcycles.

While I have shown but one embodiment of the invention it will be apparent to those skilled in the art that the invention may be embodied still otherwise without departing from the spirit and scope of the invention.

Having thus described the invention, what is desired to be secured under a Letters Patent is:

1. A motorcycle fairing for attachment to the motorcycle frame and including a windshield and comprising,
    a fairing member defining a lower frontal opening,
    a frontal closure panel on said fairing member and closing said opening and partially defining curvilinear openings through which the motorcycle fork extends, said panel openings permitting normal fork steering movement,
    fairing mounting means comprising multiple supports each removably attached at its lower end to a down-tube of the motorcycle frame, said supports each including a plate adjacent their upper ends for fairing member attachment, and
    a dash panel attached to the fairing rearward side and having a flange along its upper terminus for the reception of fasteners extending therethrough and through a windshield lower edge for securement of same to the fairing.

2. The fairing claimed in claim 1 additionally including storage bags, fabric closure strips on said storage bags and on said fairing member for interengagement enabling detachable mounting of the storage bags on the fairing member.

3. The motorcycle fairing claimed in claim 1 wherein said fairing member defines an oblong headlight opening, a pliable member secured to said fairing member adjacent the headlight opening and adapted for rested engagement with the upper edge of a motorcycle headlight to provide a glare shield.

4. The fairing claimed in claim 1 wherein said multiple supports each include semicircular fittings, adjacent their lower ends, clamps securing said fittings in engagement with the frame down-tubes.

5. The motorcycle fairing claimed in claim 4 wherein the semicircular fittings on each support are spaced from one another along their respective down-tubes to enhance support rigidity.

6. The motorcycle fairing claimed in claim 5 wherein each of said supports comprises a primary member having at its lower end one of said semicircular fittings and a secondary member having the remaining semicircular fitting attached at its lower end, a support brace extending intermediate and connecting said second member to the semicircular fitting on said primary support member.

* * * * *